Feb. 23, 1971     H. MEITINGER     3,564,840

HOROLOGICAL REGULATOR

Filed Nov. 20, 1969     6 Sheets-Sheet 1

Inventor:
HEINZ MEITINGER
BY
ATTORNEYS.

Inventor:
HEINZ MEITINGER

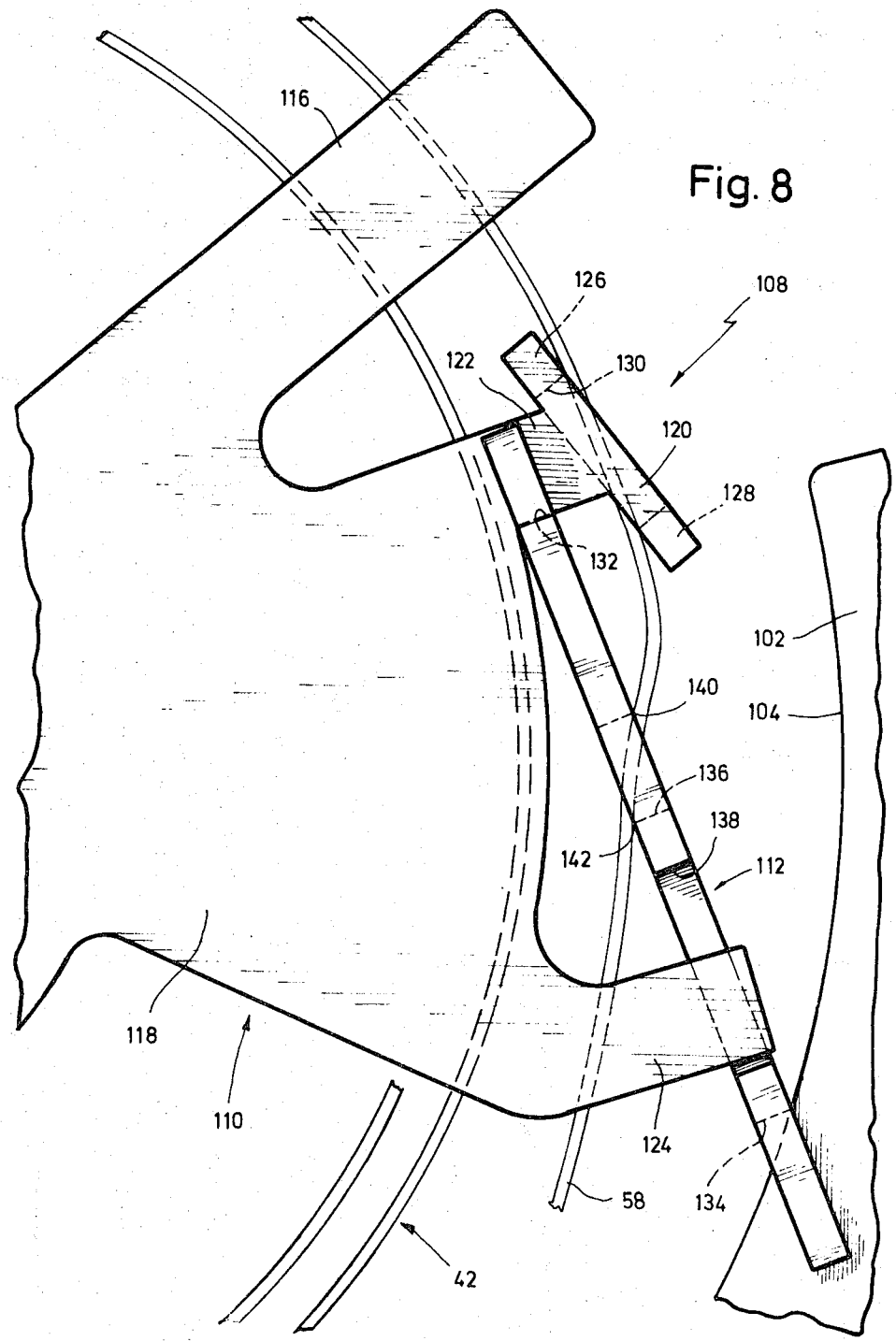

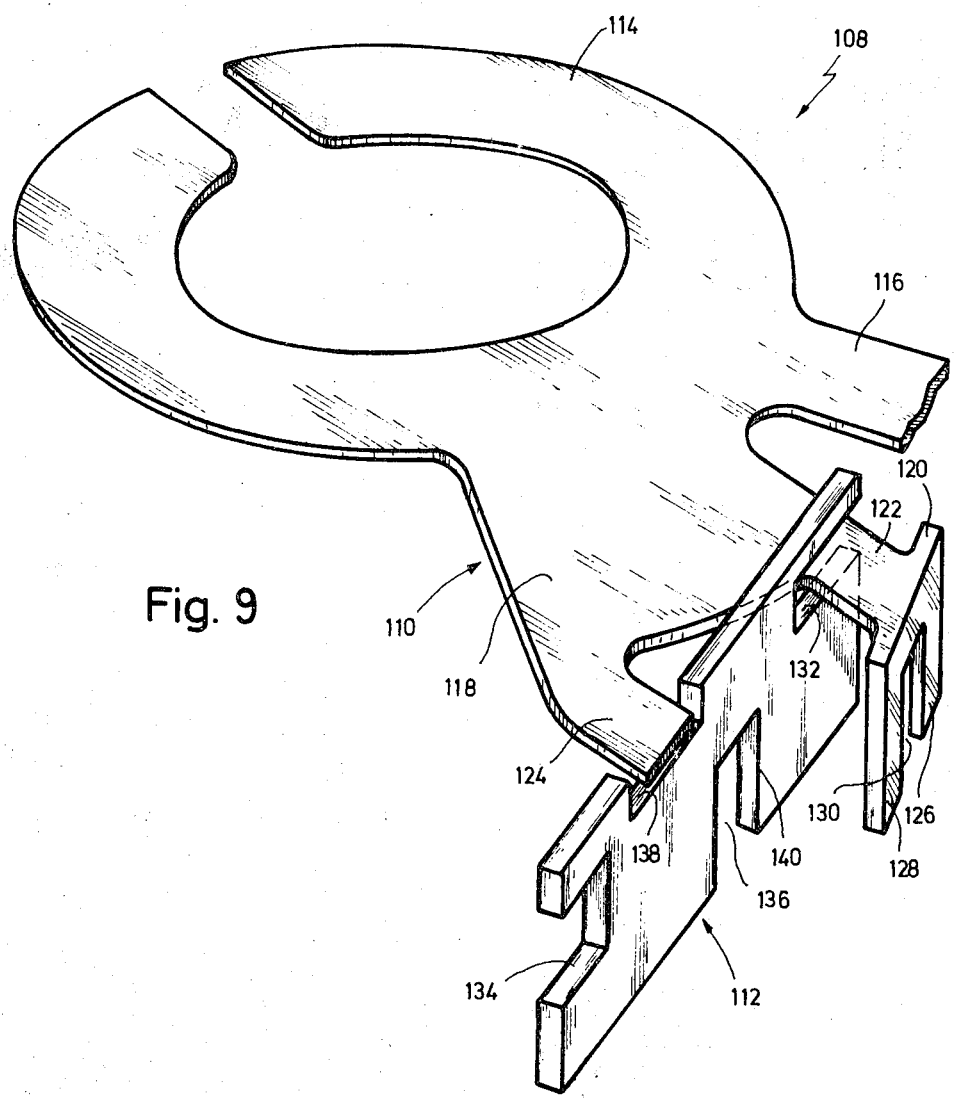

United States Patent Office 3,564,840
Patented Feb. 23, 1971

3,564,840
HOROLOGICAL REGULATOR
Heinz Meitinger, Pforzheim, Germany, assignor to Timex Corporation, Waterbury, Conn., a corporation of Connecticut
Filed Nov. 20, 1969, Ser. No. 878,364
Int. Cl. G04b *17/14*
U.S. Cl. 58—109        15 Claims

ABSTRACT OF THE DISCLOSURE

In a horological instrument, a regulating device cooperates with at least one spring and one oscillator mass to regulate the frequency of the mechanical oscillator. The regulator includes a first adjustable fork and a stabilizing fork which may be adjusted along with the first fork.

---

The present invention relates to horology and more particularly to a regulator for a timepiece.

On balance wheel watches, in which an oscillating balance wheel is connected with one end of a hairspring, the frequency of the balance wheel can be changed by altering the effective length of the hairspring. This is done conventionally by a regulator which is swivelingly arranged on the balance bearing and operates on the end piece of the hairspring, near to its point of attachment at the frame. One type of conventional regulator has two banking points which are arranged on both sides of the hairspring and effectively become one end point of the movable portion of the hairspring. In many regulators, these banking points are at a small radial distance from the hairspring, i.e., they are separated by more than the thickness of the hairspring. In case of deformation, the hairspring moves radially from one banking point to the other and furthermore exercises a small longitudinal movement between the banking points in a tangential direction, caused by the deformation of the hairspring. These are influences on the directive movement of the hairspring and consequently cause an undesirable change of the frequency.

One has already tried to overcome this disadvantage by tightly pressing the banking points against the hairspring without leaving a gap. That arrangement keeps the respective hairspring ends in place, but the influence of the residual length of the spring, that portion between the point kept in place by the regulator and the attachment at the frame, is not eliminated. That residual length of spring also carries out movements, to a certain extent, that have an unfavorable effect on the constancy of the frequency. In addition, this design has the disadvantage that the regulator is difficult to adjust. It is either necessary to lift the tightly pressed banking points off the hairspring, which is partly done by a complicated design whereby one banking point is automatically lifted off on adjustment, or the banking points are shaped like rollers that rotate on the hairspring in case of adjustment. These aforementioned designs, i.e., the automatic lifting of at least one banking point when adjusting the regulator, as well as the rotating of the rollers, necessitates a relatively complicated, and therefore expensive, design. In the arrangement in which the hairspring is loosened by lifting off one banking point, there is the disadvantage that, while adjusting the regulator (when the hairspring is lifted off one banking point) the frequency of the oscillating system does not correspond to the final frequency (when both banking points are tightly pressed again). The hairspring must always be clamped during the adjustment before measurements can be carried out.

It is the objective of the present invention to present a regulator whose adjustment is largely uninfluenced by the residual length of the hairspring, i.e., that portion of the length which lies between the regulator and the end of the hairspring fixed to the frame.

According to the present invention, the regulating device uses a forked member for stabilization in addition to a forked member used for adjustment. The stabilization member has a stabilizing effect on the residual length of the spring, i.e., between the end point of resilience and the point of attachment. The stabilization member is adjustable, on this residual spring portion, relatively to the adjustment member. This stabilization member keeps the residual portion of the spring at a certain position. If this holding position is chosen in a favorable way, during the movement of the oscillator the residual portion of the spring largely remains in rest. Practically no influence is exercised from this residual portion of the spring on the frequency of the oscillator. For positioning (keeping) the spring adjustment and stabilization, the members can be shaped in various desired ways, provided their respective positions are perfectly kept. An especially simple design results when the members are shaped like forks and have fork tines between which the spring is drawn. Favorable clamping of the spring at the selected spots results if, according to the invention, the spring then rests under elastic pressure against the two members (respectively their tines). It can be sufficient if, according to the invention, the two members have only two fork tines each. These fork tines are arranged, relative to the spring, so that they encompass the spring on opposite sides, in the same way and at a longitudinal distance. The elastic bearing of the spring against the fork tines can easily be obtained, especially if this spring is somewhat deformed due to the fork tines.

It is advantageous if the stabilization member is movable relative to the adjustment member within a predetermined limited range. The two members, during the adjustment, should be at a suffi;cient distance for stabilization, especially in case of an automatic first adjustment. To keep that distance, it is preferable that the two members are coupled in a dragging connection, i.e., the adjustment member at first carries out a certain starting movement from its initial point before the stabilization member is moved. This kind of dragging effect may exist in one or both directions of adjustment.

The dragging connection can only favorably be applied if the stabilization member is constantly moved, after an initial movement of the adjustment member, in the direction away from the point of attachment. When readjustment is carried out and the adjustment member is moved toward the stabilization member, the latter remains in its position, whereby an undesirable buckling of the residual portion of the spring is avoided. In case of readjustment away from the point of attachment, this problem does not arise, so that the stabilization member can be moved freely in this direction.

When dimensioning the range of movement of the two members towards each other, according to the invention, the two members are sufficiently close to each other (even at their greatest distance) so that the portion of the spring which is kept between them is prevented from buckling when adjusting the adjustment member in the direction of the stabilization member.

The invention is not restricted to a certain kind of spring; the springs may be of any desired kind, although only a flat hairspring is specifically described. The invention may be used for springs with a certain central rotation axis, for example, a spiral spring or a helical spring. In such a case it is advantageous if the two members are arranged coaxially with each other and preferably also coaxially to the axis of oscillation of the oscillator. Thereby the two members can be arranged directly one upon the other and slide one upon the other during the adjustment.

The stabilization member, when moving, can advantageously be guided by cams of the adjustment member and/or stationary parts, for example, parts of the frame. Preferably the stabilization member is pressed against the cams by the spring, in order to be guided safely.

Other objectives of the present invention will be apparent from the following detailed description taken in conjunction with the accompanying drawings. Two embodiments of the invention are shown in the drawings, in which:

FIG. 8 is a partial section of the top view according to FIG. 6, considerably enlarged, in order to outline the essential parts for the functioning of the regulating device; and FIG. 9 is an enlarged perspective view showing the reciprocal coordination of the adjustment member and the stabilization member of the regulating device according to FIG. 6.

Figure 1:
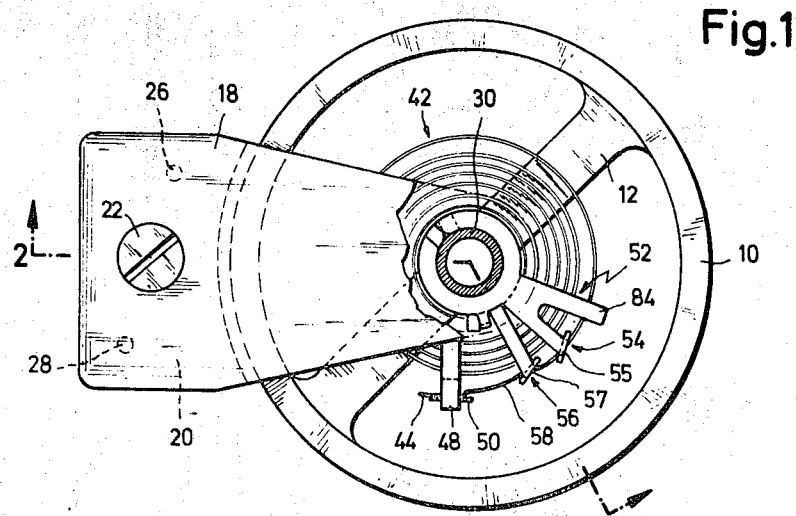
FIG. 1 is a top view of a balance wheel of a timekeeping device, namely a watch, fitted with a first type of a regulating device, in which view the balance bridge is broken, at its top, to show the outline of the regulating device.
Figure 2:
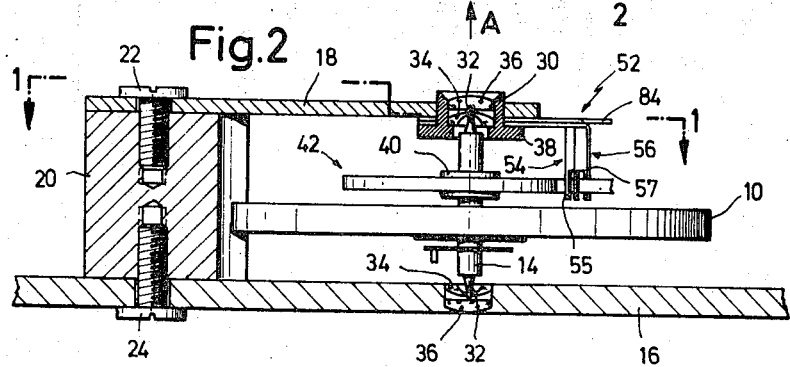
FIG. 2 is a section through the balance wheel taken along the line 2—2 of FIG. 1.
Figure 3:
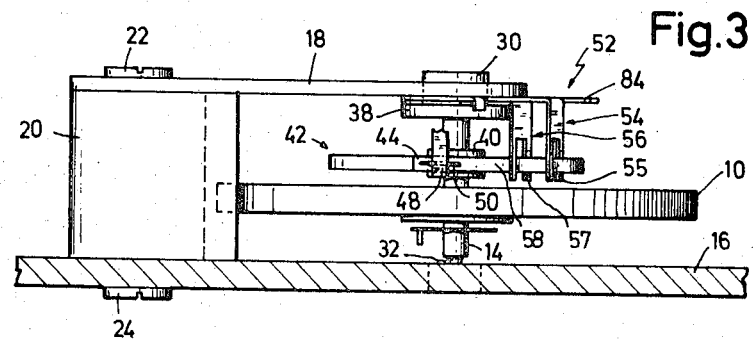
FIG. 3 is a view of the balance wheel in the direction of the arrow A of FIG. 1.

The balance wheel, shown in FIGS. 1 to 3, has a balance rim 10 and a spoke 12, which is positioned by press fit in the known way, on a balance staff 14. The oscillator mass (formed of balance rim, spoke and balance staff) is pivotally positioned in jewel bearings between a plate 16 of the movement of a timekeeping device and a balance bridge 18. The balance bridge 18 is kept at a distance, parallel to the movement plate 16, by a pillar 20. Pillar 20 and bridge 18 may be separated from one another, and loosened from the movement plate 16, by means of screws 22 and 24, set pins 26, 28, respectively.

The jewel bearing positioned in the balance bridge 18 is set in a bearing bushing 30 which is inserted in a recess of the bridge. Its opposite jewel bearing is positioned in the movement plate 16. The construction of the jewel bearings is generally known. They have a bearing ring 34 carrying the shouldered end 32 of the balance staff, said bearing ring being covered by a plate 36 which supports the shouldered end 32 of the balance staff. As shown in FIG. 2, a flange 38 is shaped on the bearing bushing 30. Flange 38 is at a distance opposite to the lower side of the balance bridge 18 (according to FIG. 2).

A conventional hairspring hub 40 is arranged, between the balance rim 10 and the balance bridge 18, on the balance staff to tie the inner end of the hairspring 42 with the oscillator mass. The outer end 44 of hairspring 44 is kept by a pin 50 in an arm 48. The arm 48 is arranged on the balance bridge and extends from that bridge downwards (according to FIG. 3).

According to the invention, a regulating device 52 is coordinated with the hairspring to adjust its effective length, i.e., the regulating device 52 adjusts the frequency of the oscillator. The regulating device 52 has an adjustment member 54 and a stabilization member 56. These two members cooperate with the outer hairspring coil, the coil which is tied at the attachment arm 48. For changing the frequency of the oscillator, the effective length of the outer hairspring coil is changeable in the generally known way. It is furthermore made certain that the residual length of the hairspring (the portion of the hairspring behind the effective portion of the hairspring) is stabilized. The residual length of the spring cannot move and therefore does not have any disadvantageous effect on the frequency of the oscillator.

The design of the regulating device 52 is described in detail by reference to the FIGS. 4 and 5. The adjustment member 54 has a fork head 55 whose fork tines 60, 62 are arranged axially parallel to the balance staff. The two fork tines 60, 62 extend downwards with their free end (according to FIGS. 2, 3 and 5) defining a first spring passage (slot) 64. The stabilization member 56 also has a fork head 57 whose fork tines 66 and 68 define a second spring passage 70. The stabilization fork tines 66, 68 extend in the same direction as the fork tines 60, 62 and are also arranged parallel to the balance staff. Each of the two fork heads is attached to a carrying arm. The fork head 55 is carried by a carrying arm 72 which extends radially from the upper jewel bearing (according to FIG. 2). The carrying arm 74, for the fork head 57, likewise extends radially from the upper jewel bearing.

The carrying arm 72 has an integral sliding ring 76 which is slotted at 78 so that it acts as a spring ring. The carrying arm 74 is integral with a second sliding ring 80, said sliding ring 80 being likewise shaped as a spring ring by a slot 82. These two sliding rings 76, 80 are arranged coaxially with each other, on the bearing bushing 30, between the balance bridge 18 and the bushing flange 38 (see FIG. 2). The inner diameters of the two sliding rings are chosen somewhat smaller than the outer diameter of the bearing bushing, to obtain a relatively high friction, so that a rotating safeguard of the sliding rings on the bearing bushings is not required.

Figure 5:
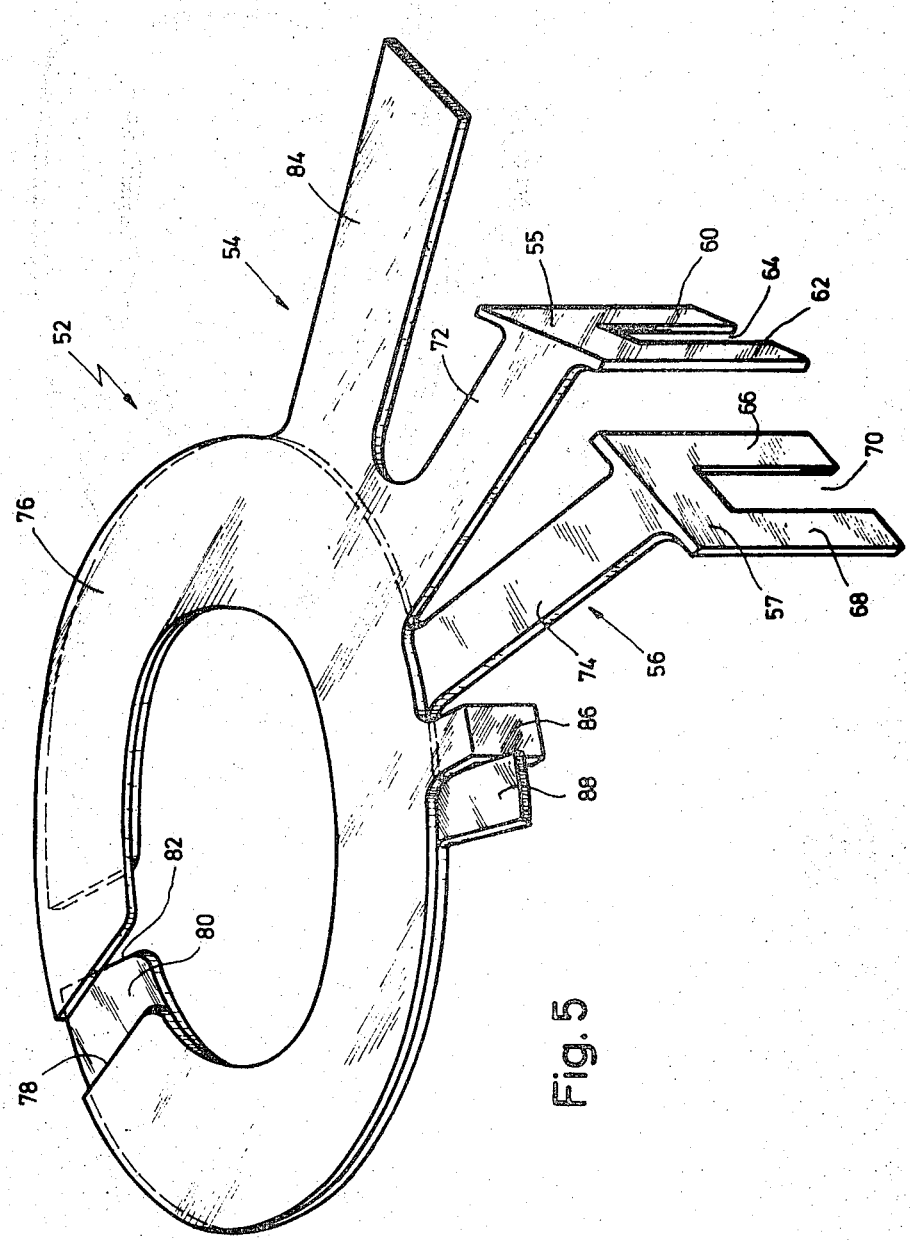
FIG. 5 is an enlarged perspective view showing the reciprocal coordination of the adjustment member and the stabilization member of the regulating device according to FIG. 1.
Figure 6:
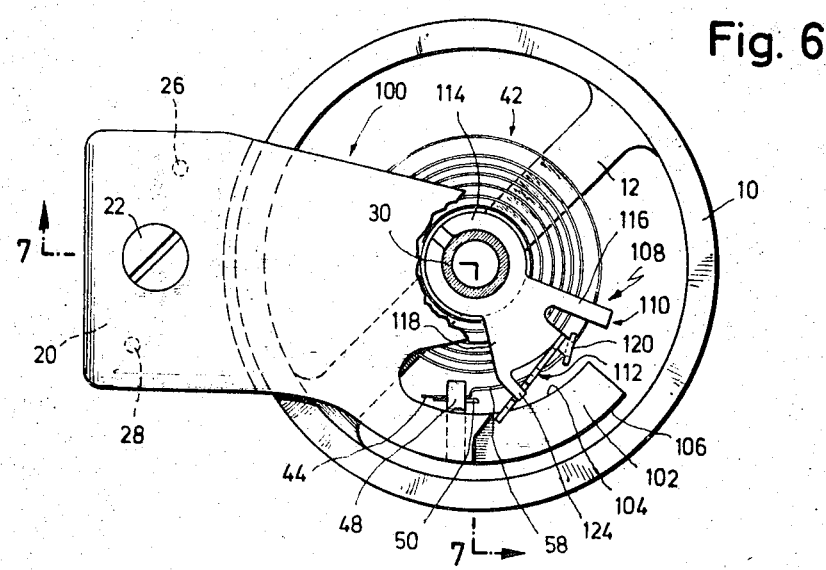
FIG. 6 is a top view of the balance wheel of a timekeeping device, namely a watch, fitted with a second embodiment of a regulating device, in which the balance bridge is shown as broken at its top to show a better outline of the regulating device.
Figure 7:
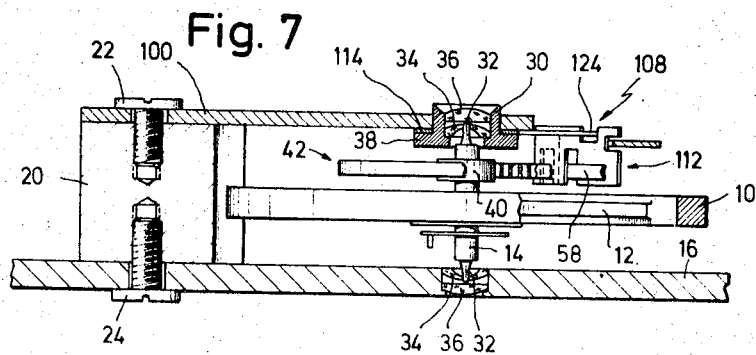
FIG. 7 is a section taken along the line 7—7 of FIG. 6.

As shown in FIGS. 1 and 5, the adjustment member 54 has a regulating lever 84 with which the adjustment member 54 can be adjusted in both directions. Furthermore, at the outer circumference of the sliding ring 76, a driving nose 86 directed downwards, is at a certain angular distance from the carrying arm 72. A banking extension point 88, at the outer circumference of the carrier 80 of the stabilization member 56, is coordinated with the driving nose 86. This banking point 88 is formed so that it is at a certain fixed angular distance from the carrying arm 74. The driving nose 86 engages between the extension point 88 and the arm 74. The width of the driving nose 86 is chosen so that the adjustment member 54 can carry out a predetermined angle of rotation before it drives the stabilization member.

Figure 4:
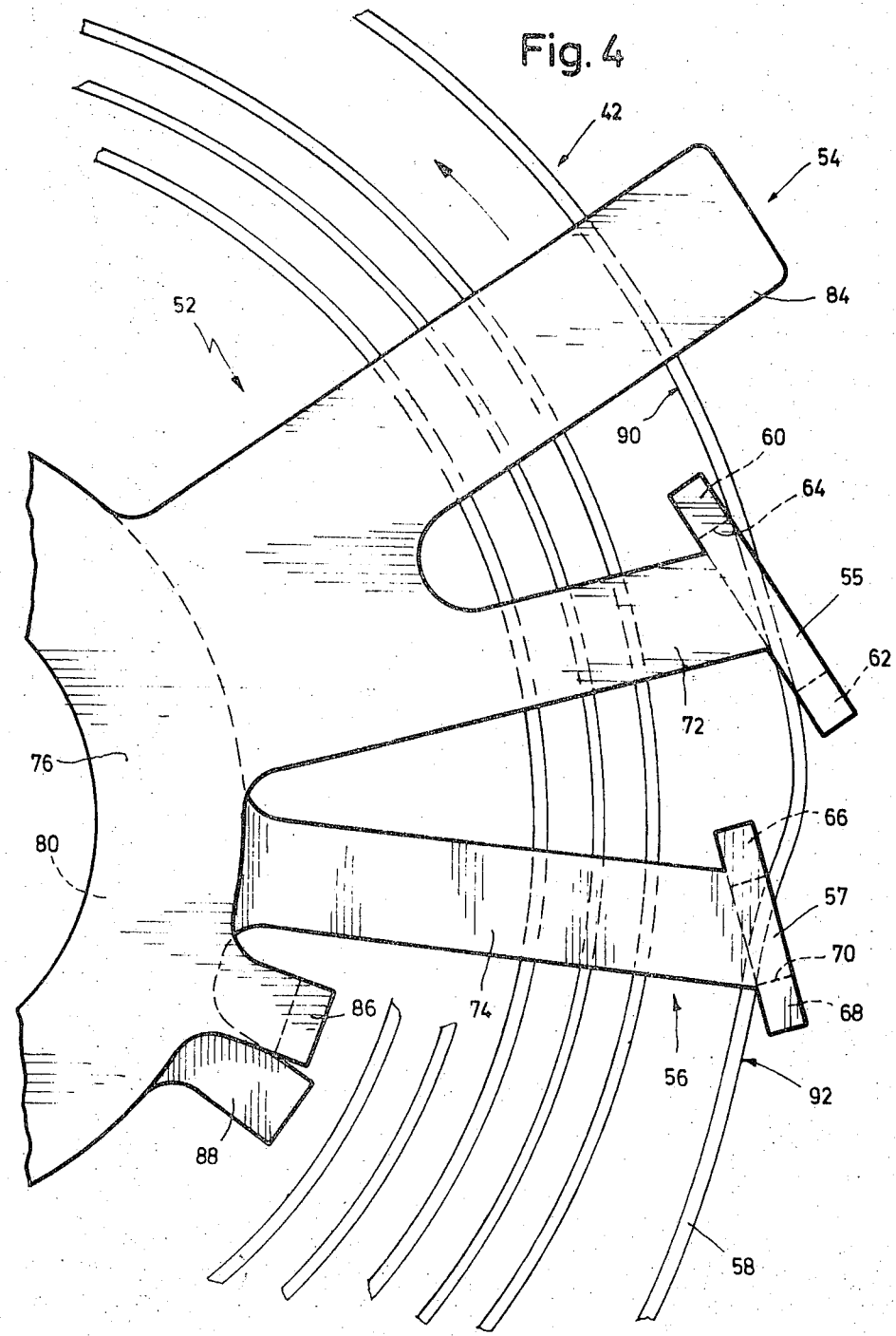
FIG. 4 is a partial section of the top view, according to FIG. 1, considerably enlarged to outline the guide of the outer coil of the hairspring through the adjustment member and the stabilization member of the regulating device.

As shown in FIG. 4, the fork heads 55, 57, seen in top view, are arranged deviating from 90° obliquely to the longitudinal direction of their carrying arms 72 respectively 74. The outer turn of the hairspring coil is lead through the slotted passages of the two fork heads. According to the invention, the oblique arrangement of the fork heads is chosen in the way that the fork tines 60 and 66 are turned away from the point of attachment of the free hairspring end of the attachment arm 48. The tines 60 and 66 bear against the inner side 90 of the outer spring coil while the fork tines 62 and 68 bear against the outer side 92 of the outer hairspring coil. Because of the oblique arrangement of the fork heads, the hairspring is bent in the opposite direction in the range of their spring passages 64 and 70 so that it bears against the tines of the fork heads under elastic pressure.

The hairspring is held in place between the fork tines so that the fork tine 60 (of the fork head 55) creates a final spot of resilience for the outer winding of the spring coil. The portion of the residual length of spring 58 extending from this final point of resilience to the attachment arm 48 is kept firmly in position by the fork head 57. That portion of the residual spring cannot move regardless if the adjustment member 54 is at rest or moves. If that portion of the spring were to move, it might have an unfavorable effect on the constancy of the frequency.

The arrangement of the stabilization member permits an adjustment of the frequency of the oscillator that is almost entirely uninfluenced by the residual length of the spring. The distance between the two fork heads is limited even with large adjusting movement of the adjusting member. If the distance between the two fork heads were not so limited, then that distance might become so large, when adjusting the adjustment member in the opposite direction (for reducing the frequency of the outer spring winding) that the spring would be buckled. The limitation is provided by the dragging connection formed by the driving nose 86, the banking point 88 and the carrying arm 74. This dragging connection makes sure that the stabilization member is driven by the adjustment member by setting of the regulator lever 84, if the adjustment member occupies a certain relative position to the stabilization member 56. The driving of the stabilization member by the adjustment member, in case of a large reciprocal distance of these two members, is towards each other (if the member of adjustment is swivelled in the arrow direction marked in FIG. 4) for the purpose of increasing the frequency of the oscillator. If the adjustment member swivels in the arrow direction, the fork head of the adjustment member slides with corresponding friction on the outer winding of the hairspring. The stabilization member remains in rest as long as the driving nose 86 bears against its banking point 88 of the carrying arm 74. From this time the two members move commonly and relatively to the hairspring.

If the frequency of the oscillator is to be reduced, the regulating lever 84 must be swiveled in the opposite direction. The stabilization member will again remain in rest as long as the driving nose 86 bears against the banking point 88 of the stabilization member. This situation is shown in FIG. 4. The portion of the hairspring kept between the two fork heads is only slightly deformed. In each phase of movement of the adjustment member and the stabilization member, the residual spring 58 is kept and the outer spring coil is arranged free from the side play in the adjustment member.

In the following description, the second embodiment of the invention is described in detail by means of FIGS. 6 to 9. Parts of this balance wheel resembling in their construction design the corresponding parts of the balance wheel according to FIGS. 1 to 3 are marked with the same reference numbers as the parts of these figures.

In this second embodiment the balance bridge 100 has a different shape. This balance bridge, at one side, has a guide part 102 having an inner concave guide edge 104. Outer limiting edge 106 of guide part 102 preferably runs parallel to the inner guide edge 104. The regulating device 108 is adjustable around the center of the oscillator mass. Analogous to the first embodiment, it has an adjustment member 110 and a stabilization member 112.

The adjustment member 110 has a slotted carrying arm 114 and is pivotly positioned on the bearing bushing between the bushing flange 38 and the balance bridge 100. A regulating lever 116 is integral with its carrying ring. A plate-like shoulder 118 carries at an angular distance from the regulating lever an arm 122 carrying a fork head 120. Shoulder 118 caries a driving nose 124 at the distance from the said arm. The fork head has two fork tines 126, 128 directed approximately vertically downwards relative to the arm 122, which tines define a first spring passage 130.

The stabilization member 112 is in the shape of a rectangular plate which is movable by the adjustment member as well as by the arched guide part 102, see FIG. 9. Plate 12 has a slot section 132 in which the arm 122 of the fork head 120 engages. A slot section 134 is arranged at its opposite face in which the arched guide part of the balance bridge engages. Approximately in the central part of the plate there extends a slotted recess 136 forming a second passage from the lower longitudinal edge of the plate to the top. At the opposite edge (according to FIG. 9 at the upper longitudinal edge) there is arranged an edge-open recess 138 in which the driving nose 124 engages, with some side play.

As shown in FIG. 8, the fork head 120 is arranged at the arm 122 in a slope deviating from 90°. The fork tine 126 bears against the inner side and the fork tine 128 bears against the outer side of the hairspring drawn through the spring passage 130. The hairspring is drawn through the second spring passage 136 so that (according to FIG. 8) the outer, upper lateral edge 140 bears against the inner side of the hairspring and the inner, lower lateral edge 142 bears against the outside of the hairspring.

In this second embodiment, fork head 120 creates a final area of resilience analogously to the first embodiment. The stabilization member insures that the residual length of the spring cannot carry out any movements behind its final area of resilience.

Due to the lateral distance between the driving nose 124 and the lateral walls of the plate recess 138, the fork head 120 is moved on the outer hairspring winding and the stabilization member is moved, in either direction, in accordance with a predetermined shift. In every position, i.e., in every phase of movement of the fork head, the hair spring is kept in position and the residual length of the spring 58 is stabilized.

I claim:

1. A regulator to regulate the frequency of a horological mechanical oscillator system, the system consisting of an oscillator mass and one or more springs, the spring being attached at one end with the oscillator mass and at its opposite end to a fixed attachment point, said regulator having an adjusting device and a stabilization device, said adjusting device having an adjustable forked member and being adjustable along the spring to vary its effective length, said stabilization device having a second fork member and exerting a stabilizing effect on the residual length of the spring positioned between the end point of resilience and the attachment point, said stabilizing member being adjustable on the residual length of the spring relative to the adjustment member.

2. A regulator in accordance with claim 1 wherein the stabilization member is arranged so that the residual length of the spring substantially remains in rest during movement of the oscillator.

3. A regulator in accordance with claim 1 wherein the spring bears against the two fork members under elastic pressure.

4. A regulator in accordance with claim 1 wherein the two fork members have at least two fork tines each that keep the spring in a twisted condition.

5. A regulator in accordance with claim 1 wherein the two fork members have two fork tines each that bear against the spring in the same way on opposite sides and at a longitudinal distance from each other.

6. A regulator in accordance with claim 1 wherein the stabilization member is movable relative to the adjustment member within a predetermined limited range.

7. A regulator in accordance with claim 1 wherein the two fork members are coupled in a dragging connection.

8. A regulator in accordance with claim 1 wherein the adjustment member has a driving means that drives the stabilization member in a dragging action in one or both adjusting directions.

9. A regulator in accordance with claim 1 wherein the two fork members are positioned so close to each other at their greatest distance that the portion of the spring kept between them is prevented from buckling when adjusting the adjustment member in the direction of the stabilization member.

10. A regulator in accordance with claim 1 wherein the two fork members are arranged coaxially to one another.

11. A regulator in accordance with claim 1 wherein the two fork members are arranged one upon another.

12. A regulator in accordance with claim 1 wherein the two fork members are coaxial to the axis of the oscillation of the oscillator.

13. A regulator in accordance with claim 1 wherein the stabilization member is guided by a cam face of a stationary part.

14. A regulator in accordance with claim 13 wherein the member of stabilization is pressed against the cam face by the spring.

15. A regulator in accordance with claim 1 wherein the spring is a spiral spring.

References Cited

UNITED STATES PATENTS

| | | | |
|---|---|---|---|
| 2,088,421 | 7/1937 | Kohlhagen | 58—109 |
| 2,524,902 | 10/1950 | Fengler | 58—109 |

FOREIGN PATENTS

| | | | |
|---|---|---|---|
| 103,661 | 5/1917 | Great Britain | 58—109 |

RICHARD B. WILKINSON, Primary Examiner

S. A. WAL, Assistant Examiner